United States Patent
Fudge et al.

(10) Patent No.: US 7,835,513 B2
(45) Date of Patent: Nov. 16, 2010

(54) SS7 TELECOMMUNICATIONS NODE AND METHOD FOR SYNTHETIC GLOBAL TITLE TRANSLATION

(75) Inventors: Philip C. Fudge, McKinney, TX (US); Maureen R. O'Toole, Plano, TX (US)

(73) Assignee: Alcatel Lucent, Paris (FR)

(*) Notice: Subject to any disclaimer, the term of this patent is extended or adjusted under 35 U.S.C. 154(b) by 908 days.

(21) Appl. No.: 11/271,289

(22) Filed: Nov. 12, 2005

(65) Prior Publication Data
US 2006/0115069 A1    Jun. 1, 2006

Related U.S. Application Data

(60) Provisional application No. 60/631,694, filed on Nov. 30, 2004.

(51) Int. Cl.
*H04Q 3/00* (2006.01)

(52) U.S. Cl. .................... 379/229; 379/230

(58) Field of Classification Search .......... 379/230, 379/207.02, 210, 220.01, 221.08–221.1, 379/229, 219
See application file for complete search history.

(56) References Cited

U.S. PATENT DOCUMENTS

| | | |
|---|---|---|
| 5,838,782 A | 11/1998 | Lindquist |
| 5,852,660 A | 12/1998 | Lindquist |
| 6,006,098 A | 12/1999 | Rathnasabapathy et al. . 455/461 |
| 6,577,723 B1* | 6/2003 | Mooney .............. 379/221.08 |
| 6,785,378 B2 | 8/2004 | Mar |
| 7,466,815 B2* | 12/2008 | Delaney et al. .............. 379/229 |
| 2003/0061234 A1* | 3/2003 | Ali et al. .................. 707/104.1 |
| 2004/0059910 A1* | 3/2004 | Allison et al. ................ 713/154 |

FOREIGN PATENT DOCUMENTS

| | | |
|---|---|---|
| CN | 1225780 A | 8/1999 |
| EP | 1296529 A2 | 3/2003 |
| WO | 97/44962 A2 | 11/1997 |

OTHER PUBLICATIONS

MegaHub® STP Point Code Mapping Document No. 071-7501-068, 31 pages, copyrighted 1997.
Office Action dated Apr. 10, 2009, issued in Chinese Patent Application No. 200510125883.X (w/English translation).

* cited by examiner

*Primary Examiner*—William J Deane
(74) *Attorney, Agent, or Firm*—Capitol Patent & Trademark Law Firm, PLLC

(57) ABSTRACT

A telecommunications node (e.g., signalling transfer point) and method are described herein that implement a synthetic GTT transformation function which allows a direct address SCCP message received from a legacy switch to be transformed into a GTA SCCP message that can be propagated to another switch (located in the same network or in a different network) which requires the use of a GTT functionality. In turn, the telecommunications node and method can also provide the reverse capability as a SCCP message comes back to the legacy switch.

17 Claims, 4 Drawing Sheets

SS7 TELECOMMUNICATIONS NODE AND METHOD FOR SYNTHETIC GLOBAL TITLE TRANSLATION

CLAIMING BENEFIT OF PRIOR FILED PROVISIONAL APPLICATION

This application claims the benefit of U.S. Provisional Application Ser. No. 60/631,694 filed on Nov. 30, 2004, the contents of which are incorporated by reference herein.

BACKGROUND OF THE INVENTION

1. Field of the Invention

The present invention relates in general to a telecommunications node (e.g., STP) and a method capable of (1) receiving a direct address SCCP message (2) transforming the direct address SCCP message into a global title address SCCP message and (3) routing the global title address SCCP message.

2. Description of Related Art

The following abbreviations are herewith defined, at least some of which are referred to in the ensuing description of the prior art and the preferred embodiment of the present invention.

AIN Advanced Intelligent Network
CdPA Called Party Address
CgPA Calling Party Address
DPC Destination Point Code
GT Global Title
GTA Global Title Address
GTT Global Title Translation
HLR Home Location Register
IN Intelligent Network
MSC Mobile Switching Center
MTP Message Transfer Part
OPC Originating Point Code
RI Routing Indicator
SCCP SS7 Signalling Connection Control Point
SCP Service Control Point
SP Signalling Point
SS7 Signaling System No. 7
SSN Subsystem Number
STP Signalling Transfer Point
TCAP Transaction Capabilities Application Part Today many carriers in the telecommunication field have older network elements (e.g., legacy SPs) which have a direct addressing capability but do not have the newer GTT capability. The older network elements that do not have the GTT capability have a limited ability to interact with newer network elements that require GTT. As such, a solution is needed that enables these older network elements a way to interact with the newer network elements that do have the GTT capability in a cost-effective way, i.e., without requiring expensive software development and upgrades on their older network elements which are approaching end of life. This problem and other problems are solved by the present invention.

BRIEF DESCRIPTION OF THE INVENTION

The present invention includes a telecommunications node (e.g., STP) and a method that can implement a synthetic GTT transformation function which allows a direct address SCCP message received from an older network element (e.g., legacy SP) to be transformed into a GTA SCCP message that can then be propagated to another network element (located in the same network or in a different network) which requires the use of a GTT functionality. Basically, the synthetic GTT transformation function takes an incoming direct address SCCP message and changes the "route on SSN" RI in the CdPA, the CgPA, or both to be a "route on GT" RI. In addition, the synthetic GTT transformation function constructs a synthetic GTA for the CdPA, the CgPA, or both and inserts it/them into the SCCP message. In one embodiment, the synthetic GTA for the CdPA is obtained from a database lookup of the DPC/SSN in the incoming direct address SCCP message. And, the synthetic GTA for the CgPA is obtained from a database lookup of the OPC/SSN in the incoming direct address SCCP message.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
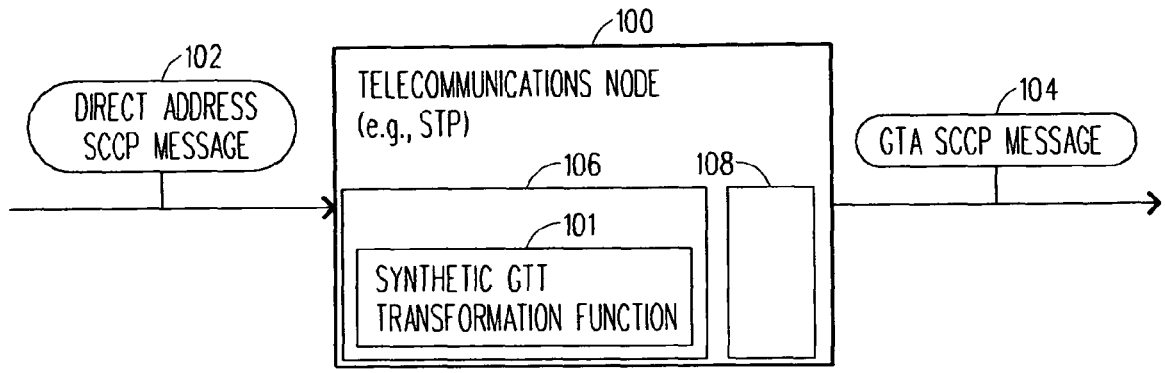
FIG. 1 is a block diagram illustrating a telecommunications node that transforms a direct address SCCP message into a GTA SCCP message in accordance with the present invention.

Referring to FIG. 1, there is a block diagram illustrating a telecommunications node 100 (e.g., STP 100) which implements a synthetic GTT transformation function 101 that can transform a direct address SCCP message 102 into a GTA SCCP message 104 in accordance with the present invention. Basically, the STP 100 has a processor 106 and a database 108 which enables the synthetic GTT transformation function 101 to perform the following actions: (1) receive the direct address SCCP message 102; (2) transform the direct address SCCP message 102 into the GTA SCCP message 104; and (3) output the GTA SCCP message 104. The traditional STP does not have this capability and as a result when it receives a direct address SCCP message it has to route a direct address SCCP message. How the STP 100 can function to transform the direct address SCCP message 102 into the GTA SCCP message 104 is described next with respect to FIG. 2.

Figure 2:
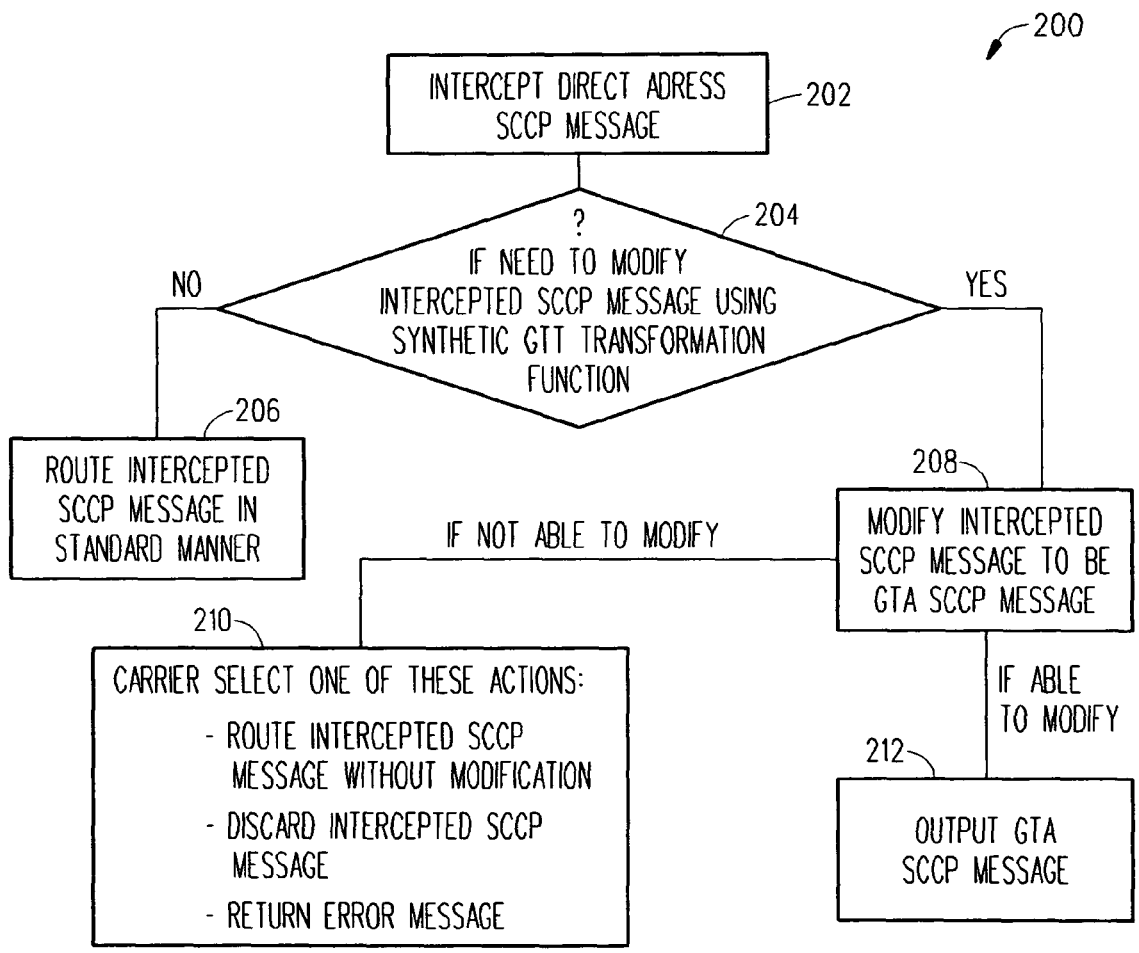
FIG. 2 is a flowchart illustrating a method used by the telecommunications node to transform the direct address SCCP message into the GTA SCCP message in accordance with the present invention.

Referring to FIG. 2, there is a flowchart illustrating a preferred method 200 that can be used by the telecommunications node 100 to transform the direct address SCCP message 102 into the GTA SCCP message 104. Beginning at step 202, the processor 106 intercepts the direct address SCCP message 102. In the preferred embodiment, the processor 106 intercepts the direct address SCCP message 102 if the DPC=STP (where the DPC is in the MTP protocol layer). And, if the DPC≠STP, then the processor 106 routes the direct address SCCP message 102 in a standard manner to a remote network element which has the same DPC. This last scenario is not shown in the flowchart, because the direct address SCCP message 102 needs to be intercepted before it can be transformed into the GTA SCCP message 104 in accordance with the present invention.

At step 204, the processor 106 determines if the intercepted SCCP message 102 should be modified by a synthetic GTT transformation function 101 or if it should be routed in a standard manner. In the preferred embodiment, the processor 106 analyzes the information in the SCCP protocol layer of the intercepted SCCP message 102 to make this determination. This information can include the following:

CdPa/CgPA
DPC/OPC (preferred)
SSN (preferred)
Global Title Indicator
Translation Type
Numbering Plan
Nature of Address
Encoding Scheme
Digits: Telephone number, SCP address . . .
Etc.

In particular, the processor 106 can lookup and compare any part of this information to the information/provisioned data stored in the database 108 to determine if there is a match that indicates the intercepted SCCP message 102 should be modified by the synthetic GTT transformation function 101. For example, the carrier may have programmed the processor 106 and database 108 to intercept all of the SCCP messages from a particular SP (see network element 302 in FIG. 3) which has a certain OPC that they know needs to have their SCCP messages modified by the synthetic GTT transformation function 101. In this case, the processor 106 can check to see if the intercepted SCCP message 102 has a CgPA(OPC) which matches an OPC (associated with the particular SP) stored in the database 108. And, if it does then the processor 106 knows that the intercepted SCCP message 102 needs to be modified by the synthetic GTT transformation function 101.

If the processor 106 determines in step 204 that the intercepted SCCP message 102 should not be modified by the synthetic GTT transformation function 101, then at step 206 the processor 106 routes the intercepted SCCP message 102 in the standard manner. In this case, the processor 106 would take the DPC from the SCCP protocol layer and insert that DPC into the MTP protocol layer of the intercepted SCCP message 102. Then, the processor 106 would route the updated intercepted SCCP message 102 to the network element that has the same DPC.

If the processor 106 determines in step 204 that the intercepted SCCP message 102 is to be modified by the synthetic GTT transformation function 101, then at step 208 the processor 106 (and in particular the synthetic GTT transformation function 101) attempts to modify the intercepted SCCP message 102 so it becomes a GTA SCCP message 104. In the preferred embodiment, the carrier has the ability to configure whether the synthetic GTT transformation function 101 modifies the intercepted SCCP message 102 such that just the CdPA is modified, just the CgPA is modified, or both CdPA and CgPA are modified to have GT logical address(es) instead of PC(s)/SSN(s). Two examples are discussed below about how the synthetic GTT transformation function 101 can modify the CdPA and/or the CgPA in the intercepted SCCP message 102.

In the first example, the synthetic GTT transformation function 101 (in conjunction with database 108) can use the SCCP DPC/SSN in the intercepted SCCP message 102 to obtain/determine the synthetic GTA (logical address) for the CdPA. This can be indicated as DPC/SSN→CdPA(GTA), where the DPC is located in the SCCP protocol layer of the intercepted SCCP message 102. And, the synthetic GTT transformation function 101 (in conjunction with database 108) can use the MTP OPC/SCCP SSN in the intercepted SCCP message 102 to obtain/determine the synthetic GTA (logical address) for the CgPA. This can be indicated as OPC/SSN→CgPA(GTA), where the OPC is located in the MTP protocol layer of the SCCP message 102.

In the second example, the synthetic GTT transformation function 101 (in conjunction with database 108) can analyze one or more parameters in the intercepted SCCP message 102 to obtain/determine the synthetic GTA (logical address) for the CdPA. These parameters may be located in one or more of the protocol layers (e.g., MTP, SCCP, TCAP, IN, AIN . . . ) associated with the intercepted SCCP message 102. For instance, the synthetic GTT transformation function 101 (in conjunction with database 108) could use the subscriber number (e.g., MSISDN or MIN/MDN) in the TCAP portion of the intercepted SCCP message 102 to construct the CdPA's global title logical information. In contrast, it should be appreciated that there are very few ways in which the synthetic GTT transformation function 101 (in conjunction with database 108) can obtain/determine the synthetic GTA (logical address) for the CgPA. In fact, the method described above where OPC/SSN→CgPA(GTA) happens to be the preferred way. In another way, the synthetic GTT transformation function 101 (in conjunction with database 108) can use the CgPA (PC) in the SCCP protocol to obtain/determine the synthetic GTA (logical address) for the CgPA.

If the processor 106/synthetic GTT transformation function 101 can not modify the intercepted SCCP message 102, then at step 210 the carrier would have the ability to configure the resulting action which should be taken such as: (1) continue routing the intercepted SCCP message 102 without modification; (2) discard the intercepted SCCP message 102; or (3) return an error response to the originator of the SCCP message 102.

Figure 3:
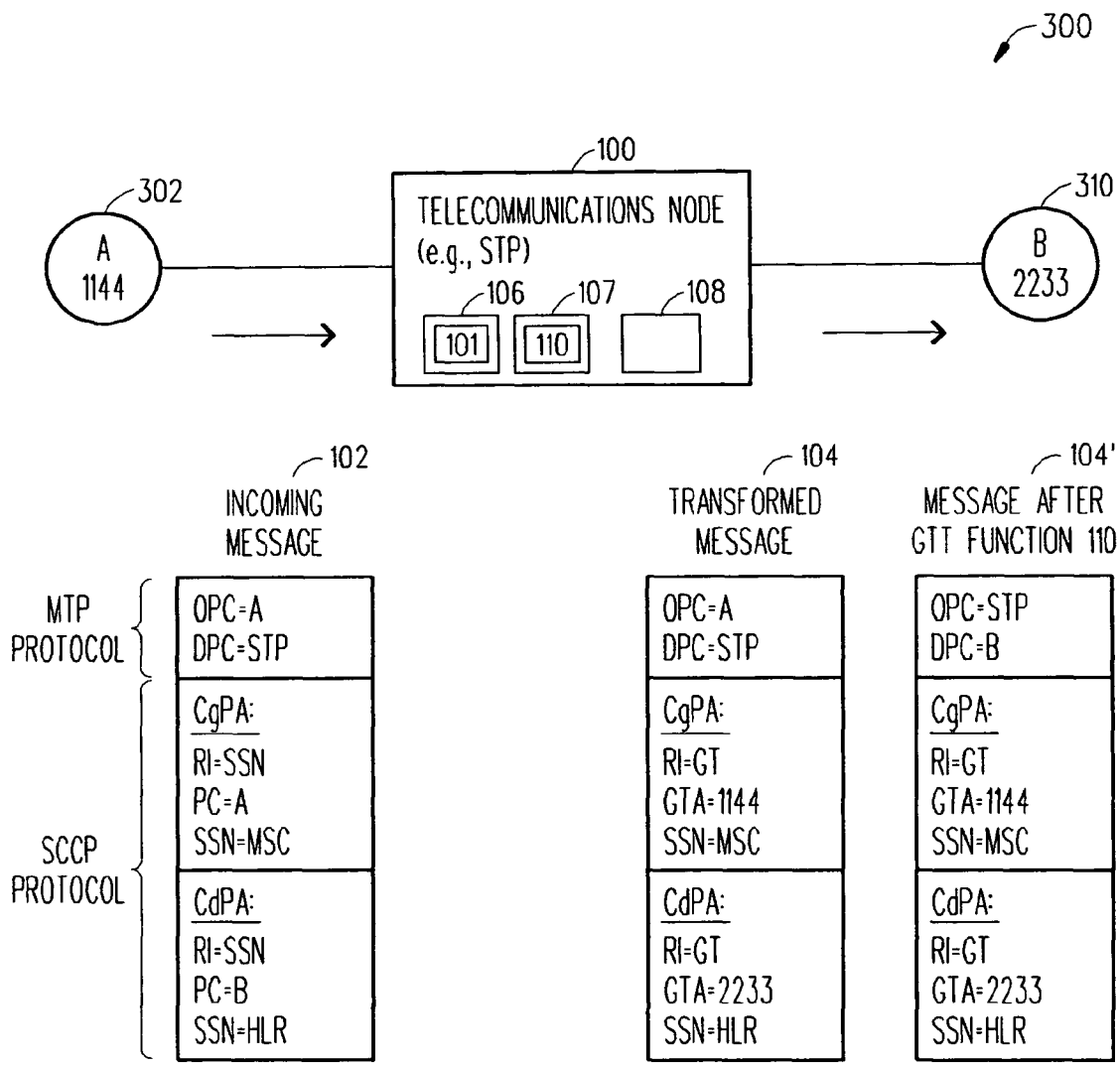
FIG. 3 is a block diagram of an exemplary telecommunications network which is used to help explain how the telecommunications node can transform a direct address SCCP message into a GTA SCCP message.
Figure 4:
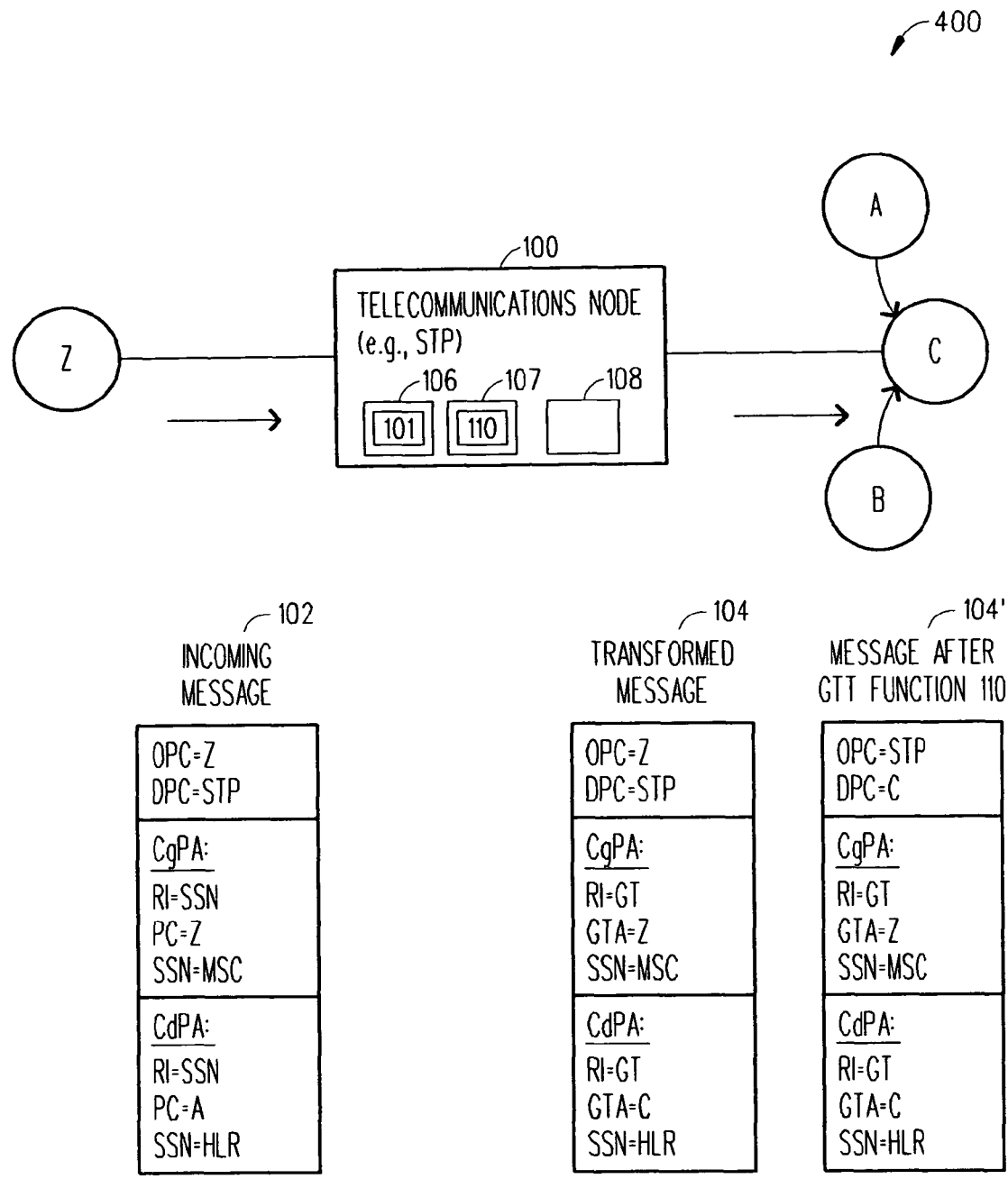
FIG. 4 is a block diagram of an exemplary wireless telecommunications network which is used to help explain one scenario in which the telecommunication node can be used to transform a direct address SCCP message into a GTA SCCP message.
Figure 5:
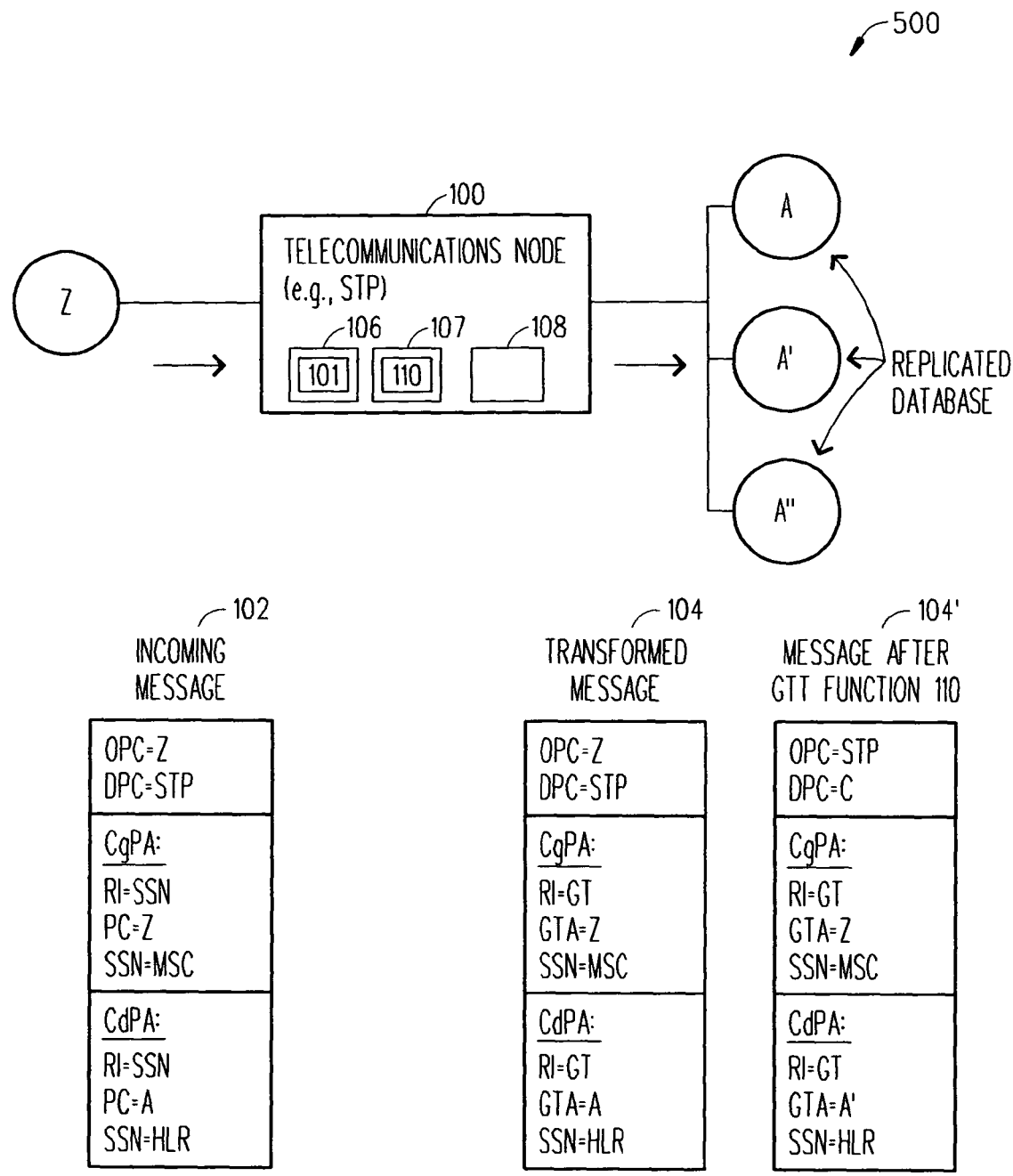
FIG. 5 is a block diagram of an exemplary wireless telecommunications network which is used to help explain another scenario in which the telecommunication node can be used to transform a direct address SCCP message into a GTA SCCP message.

If the processor 106/synthetic GTT transformation function 101 modifies the intercepted SCCP message 102, then at step 212 the processor 106 outputs the modified GTA SCCP message 104. In one embodiment as shown in FIGS. 3-5, the telecommunications node 100 contains another processor 107 that supports a GTT function 110 which re-interprets the modified GTA SCCP message 104 to obtain a DPC which is then used to route the re-modified GTA SCCP message 104' to a network element (see network element 310 shown in FIG. 3). In this embodiment, it should also be appreciated that the telecommunications node 100 can use processor 106 instead of processor 107 to support the GTT function 110. In another embodiment as shown in FIG. 1, if the telecommunications node 100 does not support the GTT function 110 then the modified GTA SCCP message 104 is sent to a network element (not shown) which has a GTT function 110.

Referring to FIG. 3, there is a block diagram of an exemplary telecommunications network 300 which is used to help explain how the telecommunications node 100 (STP 100) can transform the direct address SCCP message 102 into the GTA SCCP message 104. In this example, the STP 100 identifies the incoming SCCP message 102 from network element 302 (shown as network element "A") as needing to be modified by the processor 106/synthetic GTT transformation function 101. In particular, the incoming SCCP message 102 is intercepted because it has a DPC that is addressed to STP 100. The processor 106/synthetic GTT transformation function 101 then checks to see if the CgPA's routing indicator is set to "route on SSN". It is in this example, so the processor 106/synthetic GTT transformation function 101 performs a lookup in the database 108 for the PC/SSN. The result of the database lookup is one or more GTAs that are used to modify the SCCP address(es) in the outgoing SCCP message 104.

The user has the ability to configure whether the just the CdPA is modified, just the CgPA is modified, or both the CdPA and CgPA are to be modified in the intercepted SCCP message 102. In this example, both the CdPA and CgPA were modified. As can be seen, the modified SCCP message 104 has a CgPA in which the GTA is set to equal "1144" and the RI is set to "route on GT". And, the modified SCCP message 104 has a CdPA in which the GTA is set to equal "2233" and the RI is set to "route on GT". As discussed earlier, the CdPA modification could, alternatively, be based on using other parameters in the intercepted SCCP message 102, such as the subscriber number (e.g., the MSISDN or MIN/MDN) in the TCAP portion (not shown) of the intercepted SCCP message 102.

As can be appreciated, the modified GTA SCCP message 104 size is going to expand and the length of the fields adjusted because of the addition of the GTA information. As such, if the telecommunications node 100 has a processor 107 (or processor 106) that supports the GTT function 110 then it should be capable of segmenting and reassembling SCCP messages. And, if the telecommunications node 100 does not support the GTT function 110, then the network element that does should have a processor capable of segmenting and reassembling SCCP messages. Again, the GTT function 110 re-interprets the modified SCCP message 104 to obtain a DPC which is used to route the re-modified GTA SCCP message 104' to a remote network element 310 (shown as network element "B"). In this example, the re-modified GTA SCCP message 104' is the same as the modified GTA SCCP message 104 except that the OPC is set to "STP" instead of "A" and the DPC is set to "B" instead of "STP".

Referring to FIG. 4, there is a block diagram of an exemplary wireless telecommunications network 400 which is used to help explain one scenario in which the telecommunication node 100 can be used to transform the direct address SCCP message 102 into the GTA SCCP message 104 in accordance with the present invention. In this scenario, two old network elements "A" and "B" are consolidated into one new network element "C". And, switch "Z" sends the STP 100 a direct address SCCP message 102 which has a MTP DPC=STP and a SCCP CdPA=$PC_A$ and CgPA=$PC_Z$ where the $PC_A$ and $PC_Z$ are physical identities. In accordance with the present invention, the STP 100 intercepts the SCCP message 102. And, the processor 106/synthetic GTT transformation function 101 performs a database mapping/lookup and creates the global title translation associated with network element "C" (since it knows that network element "B" was consolidated into network element "C"). In particular, the intercepted SCCP message 102 is transformed into the GTA SCCP message 104 which has a CdPA=GTA(C) and a CgPA=GTA(Z). Then, the processor 107/GTT function 110 analyzes the CdPA=GTA(C) to determine DPC=C such that the GTA SCCP message 104' can be routed to network element "C". Because, the CgPA was also transformed into a global title, the returning message (not shown) can be routed back to network element "Z" using the GTT function 110. As can be seen, the synthetic GTT transformation function 101 allows SCCP messages 102 to be routed to the correct destination network element "C". And, the originating network element "Z" does not need to implement GTT.

Referring to FIG. 5, there is a block diagram of an exemplary wireless telecommunications network 500 which is used to help explain another scenario in which the telecommunication node 100 can be used to transform the direct address SCCP message 102 into the GTA SCCP message 104 in accordance with the present invention. In this scenario, assume a carrier (network operator) replicates a database "A" across several network elements "A", "A'" and "A''" for scaling and reliability reasons. And, switch "Z" would send the STP 100 a direct address SCCP message 102 which has a MTP DPC=STP and a SCCP CdPA=$PC_A$ and CgPA=$PC_Z$ where the $PC_A$ and $PC_Z$ are physical identities. Since, the originating switch "Z" does not address the MTP routing label directly to network element "A", the STP 100 intercepts the SCCP message 102. And, the processor 106/synthetic GTT transformation function 101 performs a database lookup/mapping and creates the global title translation that is associated with network element "A" (or network elements "A'" and "A''" it does not matter in the example). In particular, the intercepted SCCP message 102 is transformed into the GTA SCCP message 104 which has a CdPA=GTA(A) and a CgPA=GTA(Z). Then, the processor 107/GTT function 110 analyzes the CdPA=GTA(A) and based on a load sharing algorithm (e.g., weighted load share, even load share, primary back-up) selects the DPC to be either "A", "A'" or "A''". In this case, the processor 107/GTT function 110 selected DPC=A' such that the GTA SCCP message 104' can be routed to network element "A'". Because, the CgPA was also transformed into a global title, the returning message (not shown) can be routed back to network element "Z" using the GTT function 110.

From the foregoing it will be appreciated that the "synthetic GTT transformation function" of the present invention makes use of the fact that all SS7 network elements are connected to a STP. As such, the "synthetic GTT transformation function" preferably resides in the STP which can intercept messages to and from legacy switches based on DPC. The STP in implementing the "synthetic GTT transformation function" can use a processor memory resident database, accessible via an efficient Btree database method, that can provide a mapping from the DPC, OPC, SSN, CgPA, and CdPA to a synthetic Global Title Address, and vice versa. This mapping function allows a direct address SCCP message from a legacy switch to be formed as a GTA SCCP message that can be propagated to other switches, including those in other networks, that require GTT functionality. In turn, the STP can also provide the reverse capability as traffic comes back to the legacy switch.

Following are some additional features, advantages and uses of the present invention:

The STP 100 is the preferred network element on which to host the GTT function 110. For a detailed discussion about the GTT function 110, reference is made to the following patent:

U.S. Pat. No. 6,006,098 entitled "System and Method for Application Location Register Routing in a Telecommunications Network".

The contents of this patent are incorporated by reference herein.

It should be noted that the present invention works in reverse as well such that when the STP 100 receives a GTA SCCP message it can modify that message into a direct address SCCP message and send it to a network element.

There are several benefits for transforming a direct address SCCP message into a GTA SCCP message some of which are listed below:

Enables load share (see FIG. 5).

Enables least cost routing.

Is more robust.

A GTA can cross network boundaries whereas PCs may not be able to because they may not be unique between networks.

The synthetic GTA could be a logical representation of a network function that needs to be performed and not necessarily a physical network element as discussed herein. If this is the case, then it is up to the GTT function 110 to resolve this synthetic GTA into a physical point code.

The new synthetic GTT transformation function 101 could provide a carrier with significant savings by not having to upgrade the software in older network elements.

The older network element (legacy SP) as described herein does not have a GTT capability. However, it should be appreciated that the present invention could still work even if the older network element had a GTT capability but choose for whatever reason not to utilize the GTT capability.

The processor 106 described herein can perform various actions in accordance with the present invention by using specialized circuits or circuitry (e.g., discrete logic gates interconnected to perform a specialized function), program instructions, or a combination of both.

It should be appreciated that many components and details associated with the telecommunications node 100, the GTT functionality 110 etc . . . described above are well known in the industry. Therefore, for clarity, the description herein does not discuss details about those well known components which are not necessary to understand the present invention.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A telecommunications node, comprising:
a processor; and
a database, wherein said processor and said database enable a plurality of actions to be performed including:
receive a direct address SCCP message transmitted by a calling network element;
intercept the direct address SCCP message;
transform the intercepted direct address SCCP message into a global title address SCCP message by transforming a CdPA(PC) that defines a called network element in the intercepted direct address SCCP message that does not use a Global Title Address (GTA) to a CdPA(GTA) comprising a GTA of the called network element; and
route the global title address SCCP message to the called network element.

2. The telecommunications node of claim 1, wherein said processor analyzes SCCP information in the intercepted direct address SCCP message to determine if the intercepted direct address SCCP message should be routed in a standard manner or if the intercepted direct address SCCP message should be modified in accordance with a synthetic GTT transformation function to form the global title address SCCP message.

3. The telecommunications node of claim 2, wherein if said processor is not able to modify the intercepted direct address SCCP message using the synthetic GTT transformation function then said processor performs at least one of the following actions:
route the intercepted direct address SCCP message;
discard the intercepted direct address SCCP message; or
return an error message to an originator of said intercepted direct address SCCP message.

4. The telecommunications node of claim 2, wherein said processor uses the synthetic GTT transformation function to lookup information in said database and to compare that information with information in the intercepted direct address SCCP message such that the CdPA(PC) in the intercepted direct address SCCP message can be transformed to the CdPA (GTA).

5. The telecommunications node of claim 4, wherein said processor uses said database to map a DPC and a SSN associated with the CdPA(PC) to obtain the CdPA(GTA).

6. The telecommunications node of claim 4, wherein said processor uses said database to analyze one or more protocol layers in addition to a SCCP layer in the intercepted direct address SCCP message to transform the CdPA(PC) into the CdPA(GTA).

7. The telecommunications node of claim 4, wherein said database stores the following information:
a point code;
a SSN;
a global title indicator;
a translation type;
a nature of address;
a numbering plan;
an encoding scheme;
a MSISDN; and
a MIN/MDN.

8. The telecommunications node of claim 1, wherein said processor is able to segment and/or reassemble the global title address SCCP message.

9. The telecommunications node of claim 1, wherein said processor analyzes a MTP DPC in the SCCP message to determine whether or not to intercept the direct address SCCP message, and wherein said processor maps the MTP DPC and a SSN associated with the CdPA(PC) to obtain the CdPA (GTA).

10. The telecommunications node of claim 1, wherein said processor transforms a CdPA(PC) that defines the calling network element in the intercepted direct address SCCP message to a CgPA(GTA) comprising a Global Title Address of the calling network element.

11. A method of transmitting a SCCP message from a calling network element to a called network element via a telecommunications node, said method comprising the steps of:
intercepting a direct address SCCP message transmitted by the calling network element;
transforming a CdPA(PC) that defines the called network element in the intercepted SCCP message that does not use a Global Title Address (GTA) to a CdPA(GTA) comprising a GTA of the called network element; and
routing the global title address SCCP message to the called network element.

12. The method of claim 11, further comprising a step of analyzing SCCP information in the intercepted direct address SCCP message to determine if the intercepted direct address SCCP message should be routed in a standard manner or if the intercepted direct address SCCP message should be modified in accordance with a synthetic GTT transformation function to form the global title address SCCP message.

13. The method of claim 11, wherein said transforming step further includes the steps of looking-up information in a database and comparing that information with information in the intercepted direct address SCCP message such that the CdPA(PC) in the intercepted direct address SCCP message can be transformed to the CdPA(GTA).

14. The method of claim 11, wherein said transforming step further includes a step of mapping a DPC and a SSN associated with the CdPA(PC) to obtain the CdPA(GTA).

15. The method of claim 11, wherein said transforming step further includes a step of analyzing one or more protocol layers in addition to a SCCP layer in the intercepted direct address SCCP message to transform the CdPA(PC) into the CdPA(GTA).

16. The method of claim 11, comprising the steps of:
analyzing a MTP DPC in the SCCP message to determine whether or not to intercept the SCCP message; and
mapping the DPC and a SSN associated with the CdPA (PC) to obtain the CdPA(GTA).

17. The method of claim 11, further comprising a step of transforming a CdPA(PC) that defines the calling network element in the intercepted direct address SCCP message to a CgPA(GTA) comprising a Global Title Address of the calling network element.

\* \* \* \* \*